(12) United States Patent
Balisky

(10) Patent No.: US 7,147,827 B1
(45) Date of Patent: Dec. 12, 2006

(54) CHEMICAL MIXING, REPLENISHMENT, AND WASTE MANAGEMENT SYSTEM

(75) Inventor: Todd Alan Balisky, Riverside, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/674,635

(22) PCT Filed: Apr. 30, 1999

(86) PCT No.: PCT/US99/09541

§ 371 (c)(1),
(2), (4) Date: Nov. 1, 2000

(87) PCT Pub. No.: WO99/57340

PCT Pub. Date: Nov. 11, 1999

Related U.S. Application Data

(60) Provisional application No. 60/083,811, filed on May 1, 1998.

(51) Int. Cl.
  *B32B 5/02* (2006.01)
  *B01D 21/24* (2006.01)
(52) U.S. Cl. .......................... 422/110; 210/97; 205/99; 205/101; 205/123; 205/157; 204/232; 204/277
(58) Field of Classification Search .............. 422/110; 210/97; 205/99, 101, 123, 157; 204/232, 204/277
See application file for complete search history.

(56) References Cited

U.S. PATENT DOCUMENTS

| | | | |
|---|---|---|---|
| 3,602,033 A | 8/1971 | Burrell et al. ................. 73/1 R |
| 3,887,110 A | 6/1975 | Porter .......................... 222/16 |
| 4,055,751 A * | 10/1977 | Bussmann et al. .......... 700/266 |
| 5,182,131 A * | 1/1993 | Hashimoto et al. ............ 427/8 |
| 5,342,527 A | 8/1994 | Chevallet et al. ............ 210/646 |
| 5,352,350 A * | 10/1994 | Andricacos et al. ........ 205/101 |
| 5,364,510 A * | 11/1994 | Carpio .......................... 134/2 |
| 5,368,715 A * | 11/1994 | Hurley et al. ................. 205/82 |
| 5,389,215 A * | 2/1995 | Horiuchi et al. ............ 205/775 |
| 5,484,626 A * | 1/1996 | Storjohann et al. ............ 427/8 |
| 5,510,018 A | 4/1996 | Rey ............................ 210/97 |
| 5,631,845 A * | 5/1997 | Filev et al. ................. 700/266 |
| 5,750,014 A * | 5/1998 | Stadler et al. .......... 204/224 R |
| 5,976,341 A * | 11/1999 | Schumacher et al. ....... 205/101 |

\* cited by examiner

*Primary Examiner*—Glenn Caldarola
*Assistant Examiner*—Alexis Wachtel
(74) *Attorney, Agent, or Firm*—Patterson & Sheridan LLP

(57) ABSTRACT

A chemical control system for controlling the chemistry of a chemical solution having predetermined chemical constituents in a plating system, such as a NiFe plating system, employs a mix container for containing a plating solution and a hold container for containing a plating solution delivered from the mix container. A precision delivery arrangement delivers a precise predetermined quantum of a predetermined constituent of the plating solution to multiple mix containers and the hold containers. Transfer of plating solution between the mix and hold containers is effected by a transfer pump. Nitrogen gas that has been humidified with deionized water protects the plating solution from either acquiring water or becoming dehydrated, the humidified nitrogen gas being humidified to a predetermined relative humidity with respect to the temperature of the plating solution in the mix container. This is achieved by urging the nitrogen gas through a column that is at the same temperature as the plating solution. Precise delivery of the chemical constituents is achieved by a pneumatic pump arranged serially with an orifice and an inexpensive flow meter. The pneumatic pump is a positive displacement, double diaphragm pump.

26 Claims, 6 Drawing Sheets

CHEMICAL MIXING, REPLENISHMENT, AND WASTE MANAGEMENT SYSTEM

RELATIONSHIP TO OTHER APPLICATION

This application claims the benefit of U.S. Provisional Application No. 60/083,811 filed May 1, 1998.

BACKGROUND OF THE INVENTION

1. Field of the Invention

This invention relates generally to systems for controlling chemical processes, and more particularly, to a chemical analyzer system that performs several basic functions, specifically sampling, analysis, mixing, replenishment, and cleanup, and further including the functions of performing diagnostics, auto-calibration, and calculations. In addition, the invention relates to a system of humidifying nitrogen gas to a predetermined relative humidity level, and to calibration of an on-line pH sensor using an off-line pH sensor.

2. Description of the Related Art

A chemical management system, such as a system that controls a plating process is required to perform a number of functions, not all of which have been successfully implemented in the prior art. For example, in a chemical system that employs a NiFe plating bath, there is a need that the NiFe plating bath be ready for use on demand. A system that manages the plating bath, preferably should prepare and hold a new plating bath, and measure and control the bath chemistry. The temperature of the bath should be controlled and adjustments to the quantity of fluid in the bath should be effected by replenishment as evaporation occurs. In addition, it is preferred that the bath be aged by performing dummy plating.

In a manufacturing environment, there is a need to distribute the plating solution to tanks in the manufacturing area. Particles should be filtered out and a continuous flow of solution should be achieved in the interconnecting tubing.

In some manufacturing environments, multiple sets of holding and mixing tanks are provided at predetermined locations in the manufacturing area. In some cases, each set of mixing and holding tanks has a respectively associated chemistry. There is a need for an arrangement that reduces the duplicated components in a chemical control system that would control the operation of such plural tank sites.

As previously stated, at each such site there may provided a holding tank and a mixing tank. The holding tank stores plating solution that is in a condition ready to be used. The mixing tank, on the other hand, is used to make up plating solution and for dummy plating. Of course, each such tank is constructed to be chemically inert with respect to the chemistry of the plating solution. Materials that are known to be suitable for this purpose are Teflon® materials and equivalents.

There is additionally a need for a chemical control system that permits nitrogen gas to occupy the space above the liquid surfaces in the tanks. The nitrogen gas forms a blanket that prevents oxidation of the chemistry, and when properly humidified, an increase in the amount of the solution, as results from known fog humidifiers. Additionally, the properly humidified nitrogen blanket reduces dehydration of the plating solution, which would result in elevated concentration thereof.

A number of system parameters must be monitored and controlled. These included, specifically in a NiFe plating environment, the respective concentrations of Ni and Fe. In addition, the pH of the solution, as well as its density and temperature need to be controlled to within predetermined ranges. Moreover, the dummy plating system, including the plating schedule and the current used therein, must be controlled as must the Fe concentrate during dummy plating.

In addition to the foregoing, there is a need for a sensor system that provides accurate information relative to the quantity of a fluid in a tank. External proximity sensors, for example, can be falsely activated by a light crystalline tank wall build up or certain changes in environmental conditions such as humidity. Sensors used in industrial applications should not be affected by tank wall build up, foaming, stirring, temperature, humidity, RF interference, or electrical noise. The sensor system should not require adjustment after installation. Also, it should provide a continuous measurement along the full depth of the tank. Such a measurement capability allows an immediate inventory of contents that is used by other portions of the system, illustratively in accordance with control software, for continuous monitoring of pump performance and for confirmation of flow sensor accuracy.

SUMMARY OF THE INVENTION

Objects of the Invention

It is, therefore, an object of this invention to provide a sensor system that simply and economically provides an accurate indication of the quantity of fluid in a tank.

It is another object of this invention to provide a simple approach to humidifying nitrogen gas precisely to preclude either evaporation or enlargement of a plating solution in a mix or hold tank.

It is also an object of this invention to provide an arrangement of filters for a recirculating chemical.

It is a further object of this invention to provide a method of mixing and precisely delivering chemical components in a mix tank.

It is additionally an object of this invention to provide an arrangement for reliably and accurately measuring the pH of a chemical in a tank using plural pH sensors.

It is yet a further object of this invention to provide an arrangement for measuring the content of fluid in a tank, along the entire depth of the tank.

It is also another object of this invention to provide an arrangement for maintaining a constant temperature in a fluid that is to be circulated.

GENERAL INTRODUCTION TO THE SYSTEM OF THE PRESENT INVENTION

The foregoing and other objects are achieved by this invention which provides, in one aspect thereof, a NiFe blend, analyzer, and distribution system. This specific illustrative embodiment of the invention is designed to achieve the following principal objectives:

Automated precision blending and mixing of NiFe plating solution

Automatic solution preparation via mixing, filtering, and dummy plating

Automated solution maintenance through temperature control, continuous filtration and chemical analysis, and replenishment Connectivity to customer-provided distribution loop(s), chemical feedstocks, and a host computer network Continuous supply of prepared NiFe solution to distribution loop(s) by means of a holding, or distribution, tank. This tank is automatically refilled (based on level) after a user definable amount of solution has been distributed to the plating tools via the distribution loop.

Chemical Support Mix and Distribution System

The following first portion of the system of the invention relates to the Chemical Support Mix and Distribution System. All operational functions are accessible from the System Manager.

Blending and Mixing

Precision blending is achieved through the use of high accuracy, low maintenance delivery systems and level sensors for wet chemistry and water additions. Manual, dry chemical additions are assisted by means of operator prompts and instructions and easy access delivery panels. The system is designed to accommodate future expansion and retrofit with respect to automated dry chemical delivery systems for chemicals such as sodium saccharin, boric acid, and the like.

Efficient solution amalgamation is achieved through a combination of variable speed mixing, temperature control (primarily to assist in the dissolution of boric acid), and recirculation. Continuous level monitoring provides fault-high, process, and fault-low level control and alarm functions. Level monitoring and solution metrology is used together as port of system diagnostics to alert the operator to possible subsystem failures or necessary component calibration(s).

Solution Preparation

Solution preparation includes continuous filtration via recirculation through an external heat exchanger. In addition, the mix tank is equipped with the necessary hardware to allow electroplating to occur inside the vessel. The anode and cathode are placed in a separate container from which the solution in the mix tank is reticulated during the dummy plating cycle. Keeping the electrodes separate from the solution in the mix tank avoids further dissolution of the anode, which could affect solution composition and contamination. In addition, this design accommodates easy removal of the anode and cathode assemblies when necessary.

Solution Storage and Distribution

Once the solution preparation and adjustment (metrology) have been completed in the mix tank, the system transfers the solution to a holding/distribution tank. Once in the holding tank, the solution continues to be monitored for composition assay and temperature. Adjustments are automatically carried out by the metrology control system with respect to composition. The temperature is controlled locally at the holding tank, and the metrology control system monitors the temperature and provides operator alerts and alarms should the temperature deviate beyond the user-definable range. The holding tank is equipped with continuous level monitoring and control. The primary functions of the level monitoring at the holding tank are (1) fault-high and fault-low monitoring alarming and functional interlocks, (2) automatic adjustment of replenishment calculation based on actual level, and (3) transfer signals in order to request the transfer of solution from the mix tank to the holding tank.

The system includes connections that allow the solution in the holding tank to be distributed to a "global loop," (the global loop feeds the actual plating reservoirs) and then recirculated back to the holding tank. The point of return also includes filtration that is used to filter any particulate that may have been introduced from the global loop.

After the solution from the mix tank has been transferred to the holding tank, the blending and preparation of a new batch of NiFe solution begins. The mix tank and the holding tank function together in such manner as to ensure that the holding tank does not run empty or ever be overfilled. The solution in the mix tank will not be transferred to the holding tank until it has completed all of its preprogrammed routines for proper solution preparation Solution Maintenance Critical parameters of the solution are monitored and controlled using a combination of automated titration technology as well as the incorporation of other subsystem components for monitoring other items, such as direct pH and specific gravity. Continuous filtration is accommodated by recirculating the solution through an external heat exchanger that is designed for heating and cooling requirements. Filter pressures and temperatures are monitored from the System Manager, which will be described below. The System Manager additionally provides operator alert and alarms indicating component failures or required maintenance.

Each filter location is equipped with dual filtration for automatic switching. When the system senses that one of the filters is building up differential pressure, it will automatically activate the necessary valves in order to switch to a backup filter and alert the operator that the primary filter needs to be changed. Once the automatic switch-over is made, the backup filter will become the primary filter and the newly replaced filler will become the backup. This design permits filter maintenance without shutting down the tool or interrupting the supply of solution to the distribution loop System Manager The System Manager, in a practical embodiment of the invention, is Semi S2-93 and 03 certified and, in a practical embodiment of the invention, provides host communication protocol in either standard ASCII, DDE, or 513C5/GBM (serial or Ethernet). All functions for the blend station and metrology control system including data export, history, maintenance, and reporting, are available from the System Manager (IBM PC). The System Manager is a computerized control center designed to be very user-friendly. Its use of graphics and data display screens allows the operator to interface with the system effectively and with minimal training. The System Manager displays and stores process conditions and analytical results and uses the information to initiate alerts, alarms and other automated control functions such as chemical dispensing, replenishment, cleanup, calibration routines, and the like.

Chemical Control System

The chemical control system of the present invention includes in certain embodiments up to four (4) modules:
  An automatic chemical analyzer;
  An automatic chemical replenisher;
  A variable I/O interface (LCU) for communications and control of remote electro-mechanical devices and computer-based systems; and
  A PC System Manager for tying all of the modules together into a complete process control and MIS system as well as providing a graphical operator interface with operator alert and alarm reporting.

Chemical Analyzer

The Analyzer is at the heart of the system and provides high accuracy with respect to on-line automatic chemical analysis. This analyzer is designed to draw samples automatically from multiple process baths, perform chemical analyses of the process chemistries, and send the results of the analysis to a computerized manager, which will be described below. The self calibration and diagnostic routines programmed within the analyzer ensure consistent performance and high accuracy with respect to analytical measurements and chemical monitoring.

Chemical Replenisher

The Replenisher receives chemical addition instructions from the System Manager based either on programmed conditions (actual analytical results versus desired operating ranges) or in response to manually entered operator commands. The system is designed to maintain inventories of chemical stocks and deliver reports on chemical usage by the process bath. In a specific illustrative embodiment of the invention, there is provided a keypad for remote operational control.

Local Control Unit-Variable I/O Interface

The Local Control Unit (LCU) monitors physical process parameters such as temperature level, conductivity, pH voltage, etc. The LCU Is designed to receive digital or analog signals from local control devices. This information is communicated to the System Manager via a serial link, compared to operator-defined set-points, and is logged into history files. The information is used to provide alert and alarm conditions and to initiate control functions that are serially communicated back to the LCU. The LCU then electronically activates the particular hardware that has been predetermined to be required for effecting the required adjustment, e.g., heating and cooling devices, water solenoids, drain valves, etc.

Primary Automated Routine

The primary automated routine of the system of the present invention includes the following steps of operation:

| | |
|---|---|
| 1. Power On | All components and subsystems initialized and set to standby mode |
| 2. Start New Batch | At operator command, all settings are checked for valid entry user-defined recipe of events and begin |
| 3. DI Water Fill | X volume controlled by flow sensor confirmed by level sensor |
| 4. Operator Prompt | Prompt Operator (or user-defined manual step(s) |
| 5. Operator Confirmation | Requires confirmation of manual step to continue program |
| 6. Chemical Blending | Mixer starts, chemicals are added via precision flow sensors. confirmed by level |
| 7. Chemical Mixing | Solution is mixed for X seconds/minutes |
| 8. Mixing Confirmation | Solution is analyzed for Ni, Fe end or pH twice with stirrer on. If confirmation fails test is rerun X times before alarming operator |
| 9. Solution Maintenance | Solution is analyzed for Ni, Fe and/or pH. Appropriate concentrates are replenished to bring the solution to specification |
| 10. Chemical Mixing | Same as Step 7 |
| 11. Mixing Confirmation | Same as Step 8 |
| 12. Dummy Plating | (Chemical analysis and replenishment can be individually activated or suspended during dummy plating cycle.) Solution is brought to operating temperature electrodes are lowered into solution and current is applied at user-defined settings and for user-defined amp-minutes |
| 13. Amp-minute Tuning | All replenishment chemicals can be added based on an analysis result as well as amp-minutes. |
| 14. Amp-minute Tuning | If flagged or chosen, amp-minute replenishment is automatically adjusted based on an analysis result. |
| 15 Operator Prompt | Requires operator approval to open the distribution loop valve |
| 16. Distribution On | Solution is continuously monitored, controlled and aged |
| 17. Distribution Off - Level Low | System either goes into standby mode, or starts the cleanup routine and then into standby |
| 18. Cleanup | This routine is user-definable. Spray headers and water fill valves, as well as pumps and mixers, are sequentially assigned to operate as part of the cleanup routine. |
| 19. Return to Step#2 | |

The IBM-compatible PC-based System Manager of the present invention is a standalone unit that coordinates the operation of the other components into a fully integrated network. The system provides total control over any chemical process. The System Manager records the information it receives into a database and maintains historical records on each process parameter. The current parameter values are compared to established set-point limits to provide alert and alarm indications as well as initiate automated control functions. The module responsible for controlling each parameter activates the necessary control equipment to return that parameter to its optimum value.

The System Manager provides the operator with a full-color, menu-driven display of all process information being accumulated by the other modules. The operator is then enabled to access desired information by selecting the appropriate display screen on the system terminal. In a specific illustrative embodiment of the invention, each screen is set with tiered password protection. Graphic display screens provide selection and examination of, inter alia:

Process Status
Parameter Status
Parameter History
Parameter Set-point
Parameter Data Accumulation Schedule
Parameter Replenishment Information
Status Displays for individual PS modules Chemical/Metrology Control System In the second portion of the system of the invention, described below, there is provided a Chemical/Metrology Control System. In a Chemical Analyzer portion of this system, there are performed three basic functions, specifically, sampling, analysis, and cleanup. Included in these functions are diagnostics, auto-calibration, and calculations.

Sampling

Sampling retrieves liquid from a tank, sample loop, or grab sample receptacle and delivers it to the analysis cell. For titrations and/or analyses where an exact quantity of a sample is required, the sample syringe is cycled to pump in the sample and purge any other liquid. Several cycles of sample are delivered to the beaker to ensure a representative sample. During this phase both a timer and a sample arrival detector are used to verify that sample arrived in adequate time for the analysis to proceed. The beaker is thoroughly cleaned before the final sample dose is dispensed. For analyses where the sample is tested directly, without any dilution, the liquid is either pushed into the analysis beaker by the pressure in the sample loop or drawn in by an eductor.

Analysis

Analysis is performed after the sample has been delivered to the cell. A titration analysis may be performed with an optional conditioning reagent delivered by gravity through a solenoid valve. Titrant is conveyed by a syringe controlled by a stepper motor. Titrant is continuously added while analog readings are taken in intervals in order to find the endpoint. Once the endpoint is found, the beaker is cleaned and the test is repeated until the results agree within a user-specified tolerance. A minimum of three replicates is required with a maximum of nine is allowed. As soon as the results are satisfactory for noncontiguous analyses, the analyzer performs a thorough cleanup to avoid cross contamination Cleanup The cleanup procedure rinses out all the analyzer components that came in contact with the sample solution. This starts with an air purge through the rotary valve(s) and filters. If the sample fails to clear through the line, an error condition is generated for subsequent analyses warning that the air pressure is low. Once cleared by air, the rinse water, in the form of bursts to maximize the rinsing effect, is turned on and, if used, the sample syringe is cycled until it is cleaned (depending on the process for which the analyzer is being used, there may not be a water rinse of the sampling lines). Following this, the direct fill line to the beaker is cleared.

Grab Sample

Bottled samples may be presented to the Analyzer for analysis at the grab sample sipper port. For optimum results the sample concentration should be within the specification range (alarm limits) of the parameter being tested. Various methods may be used to analyze a grab sample.

pH Electrode Calibration

The pH calibration is performed before an analysis using the pH electrode if a user specified time has elapsed since the last pH calibration. The calibration uses two pH buffers to determine the slope and the offset of the pH electrode. A stable reading is obtained on one buffer, then the beaker is cleaned and a reading is taken on the other. The slope value in transmitted to the System Manager to enable the operator to know the condition of the electrode. The slope and offset values are retained by the analyzer to convert voltage readings to pH values. The frequency of calibration is set through the analysis configuration table register titled, in this embodiment, "Hours Calibration Valid."

ORP Electrode Calibration

Because the ORP electrode is used for differential, rather than absolute, titrations, calibration is unnecessary. However, determining the sensitivity of the electrode is desirable since can vary with use. Electrode sensitivity, calculated as a ratio of actual response to ideal response, is reported after each analysis and can be viewed at the System Manager with the other Analyzer parameters.

Chemical Replenisher

The replenisher is capable of executing instructions entered at the System Manager. The Replenisher simultaneously controls delivery of multiple feedstocks to multiple processes. Flow rates are monitored and when chemical delivery reaches to requested quantity, feed is automatically shut off. The total chemical delivered is recorded by the Replenisher for each feedstock. These values are used to activate low level warnings. The totals and other information are available to the operator and remote computer.

Chemical Blend and Distribution System

In a practical embodiment of the invention, the chemical blend and distribution system includes a HCl chemical feedstock cabinet designed to hold two (2) 10 L containers of HCl. This system delivers acid to two locations, alert the operator when the acid level is low, and provide an alarm to the operator when empty. Some of the hardware and collateral equipment that is employed with this system includes:

Pump cart and shelves for containers
Pneumatic valves (×2), pumps (×2) and filters (×2)
Secondary containment, leak detection, and Interlocks
Fittings for facilities and connections, including a Fe feedstock reservoir designed to fill automatically at a user-defined level and dispense as needed to the Chemical Mix support tanks.
Reservoir
Fill pump, valve, and filter
Delivery pump and valve
Level control—Fault high, full, fill, empty
Secondary containment leak detection, and interlocks
Fittings for facilities and connections
Water inlet valve end cleanup spray gun
Electrical Package—Includes embedded controller and I/O Chemical Metrology Control System This System is designed to sample and analyze solutions from the two mix tanks and make chemical replenishment adjustments based on the analysis result. The metrology system is programmed to execute to following tasks based on a user-defined schedule:

Specific gravity monitoring and adjustment
Nickel analysis and adjustment—Measurement to ±1.0% of range
Iron analysis and adjustment—Measurement to ±0.5% of range
pH monitoring and adjustment—Measurement to ±0.01 pH units
Amp minute replenishment option of HCl, Fe and Water System Manager—Operator Interfaces In a practical embodiment of the invention, the System Manager is implemented in an IBM-compatible PC and is designed to provide operator control of all routines and electro-mechanical and computerized components and subsystems. This System Manager also provides operator alert and alarms as well as complete history, charts and graphs on all parameters monitored and, or controlled by the System. The parameters include:

Feedstock levels, inventories and usage history
Feedstock pump and valve controls
Chem, blend, mix, electroplating, and cleanup routines
Pneumatic controls end motors Process control parameters include:
Feedstock filter pressures
Recirculation flow rate
Mix tank temperatures
Mix tank levels
Density
Nickel
Iron
pH

SUMMARY OF THE CLAIMED INVENTION

The foregoing and other objects are achieved by this invention which provides a chemical control system for controlling the chemistry of a chemical solution having predetermined chemical constituents in a plating system. In accordance with the invention, the control system employs a mix container for containing a plating solution and a hold container for containing a plating solution that has been delivered thereto from the mix container. Delivery of a precise predetermined quantum of a predetermined constituent of the plating solution is effected by a precision delivery arrangement. The quantum of predetermined constituent is delivered to the mix and hold containers by a precision delivery arrangement. Plating solution is transferred between the mix and hold containers by a transfer pump. Additionally, a nitrogen gas source provides a nitrogen gas that is humidified to a predetermined relative humidity with respect to the temperature of the solution in the respective mix or hold container to which it is delivered. This humidified nitrogen prevents evaporation of the plating solution and also prevents the plating solution from acquiring or releasing water.

The nitrogen gas is humidified by bubbling same through a column of deionized water that is in thermal communication with the tank of chemical solution. The humidified nitrogen gas is then released to the tank where it forms a layer over the plating solution, as described. The extent to which the nitrogen gas is humidified is to an extent a function of the depth in the column at which the nitrogen source gas is placed to release the nitrogen source gas in the deionized water. Each of the mix and hold tanks is provided with a associated column of deionized water for effecting the control of the relative humidity of the nitrogen gas.

In accordance with a further aspect of the invention there is provided a precision delivery arrangement for a chemical control system. A pneumatic pump having a pump inlet for receiving a chemical to be delivered and an outlet for issuing the pumped chemical is coupled to an orifice of predetermined internal dimension. The orifice is then coupled to a flow meter for providing an indication of the rate of flow of the chemical through the orifice.

In one embodiment, the pneumatic pump is a positive displacement, double diaphragm pump. In a practical embodiment, the pneumatic pump is configured to pump a chemical at a chemical flow rate of approximately 50 ml per minute to approximately 2 liters per minute. Preferably, the chemical is caused to flow at a rate of approximately 100 ml per minute to 1 liter per minute. Preferably, the pneumatic pump has a rated flow rate of approximately between 2 and 10 times the chemical flow rate, and preferably at least approximately four times the chemical flow rate. Further, in one embodiment, the orifice has an internal diameter of approximately 0.010" and 0.090". In a practical embodiment of the invention, the internal diameter is approximately between 0.030" and 0.060".

BRIEF DESCRIPTION OF THE DRAWING

Comprehension of the invention is facilitated by reading the following detailed description, in conjunction with the annexed drawing, in which.

DETAILED DESCRIPTION

Figure 1:
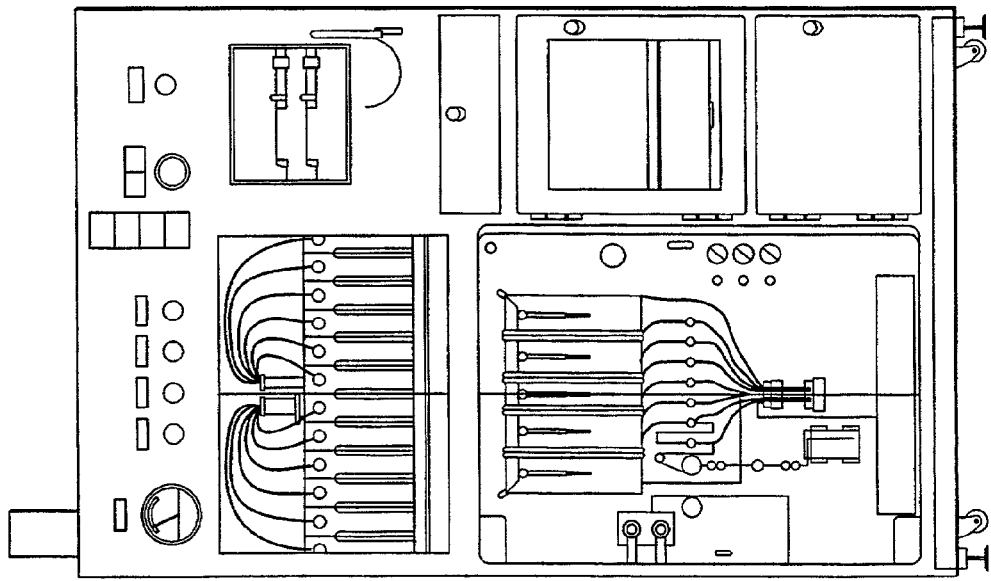
FIG. 1 is a partially schematic plan illustration of an analyzer manager system that analyzes and controls the chemistry in a chemical processing system, particularly Ni (nickel), Fe (iron), and pH, in this specific illustrative embodiment of the invention.

FIG. 1 is a partially schematic plan illustration of an analyzer manager system that analyzes and controls the chemistry in a chemical processing system. As shown, an analyzer 100 analyzes the nickel (Ni) iron (Fe) and pH components and characteristics of a chemical bath (not shown in this figure), which in this embodiment of the invention is a plating solution. All control software embodied in analyzer 100 is written in a flow chart language tool designed by Opto 22. The use of this software greatly reduces start-up, maintenance, and upgrade, as well as revision costs. This flow chart language tool allows the entire program to be viewed, executed, monitored, and modified in flow chart form. In a diagnostic mode, the flow chart symbols are highlighted as they are executed, and such execution can be stopped, single-stepped, or interrogated at will. The subject flow chart language tool is commercially available and has associated therewith a broad array of digital and analog I/O hardware that is readily integrated with the software to provide a complete package.

Figure 2:
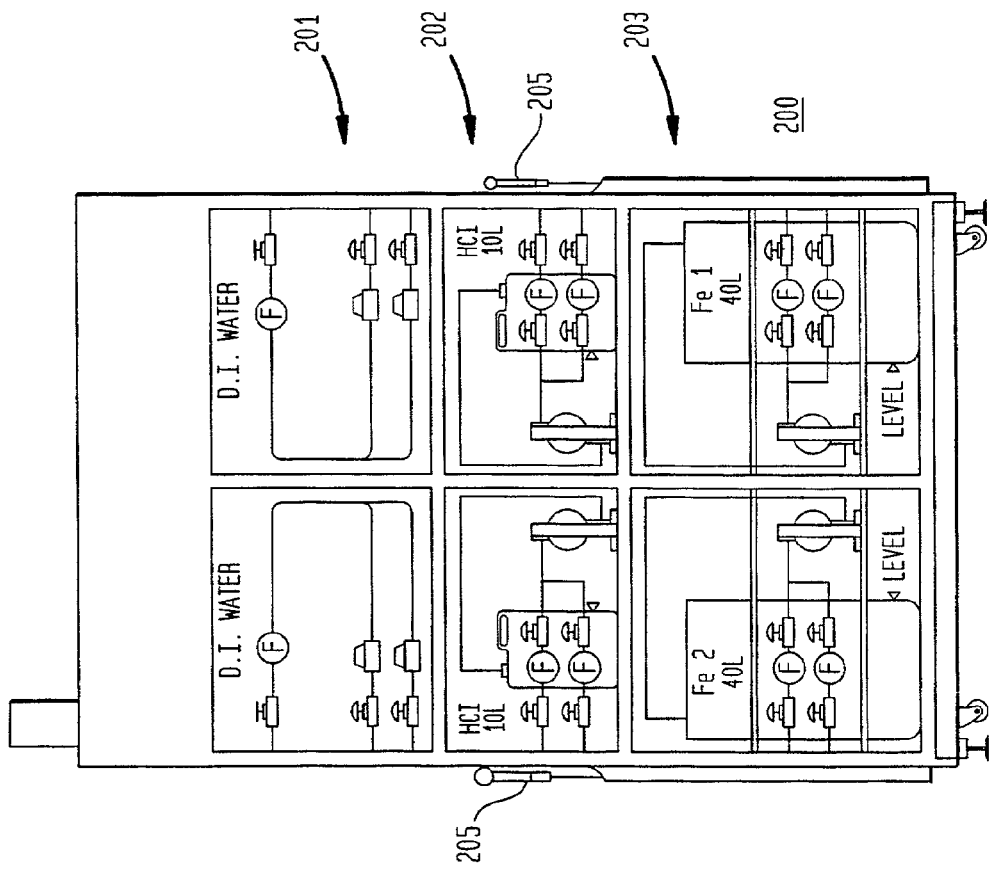
FIG. 2 is a partially schematic plan illustration of a chemical replenisher system that, in this specific illustrative embodiment of the invention, replenishes HCl and Fe feedstocks, as well as deionized (DI) water.

FIG. 2 is a partially schematic plan illustration of a chemical replenisher system that, in this specific illustrative embodiment of the invention, replenishes HCl and Fe feed stocks. In addition, the replenisher supplies deionized water. Replenisher 200 is shown to be provided with certain stores of the feed stocks and the deionized water to be dispensed. Deionized water is maintained in region 201 of replenisher 200. HCl is stored in region 202, and Fe is contained in region 203. The substances stored in this replenisher are provided to hold and mix tanks, as will be described below with respect to FIG. 3. In this specific illustrative embodiment of the invention, replenisher 200 is provided with a local water gun 205 that provides a source of deionized water for the rinsing of components and for emergency washing.

Figure 3:
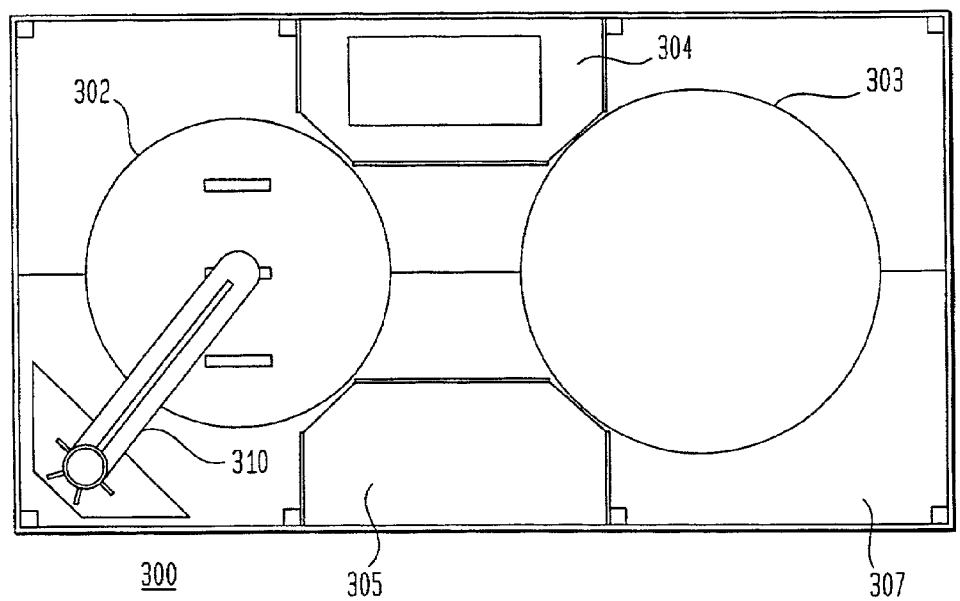
FIGS. 3–5 are top, end, and front plan representations, respectively, of a NiFe blend and distribution system constructed in accordance with the invention.
Figure 4:
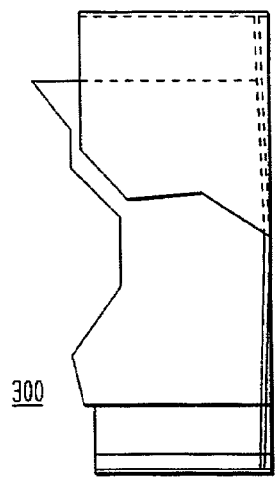
Figure 5:
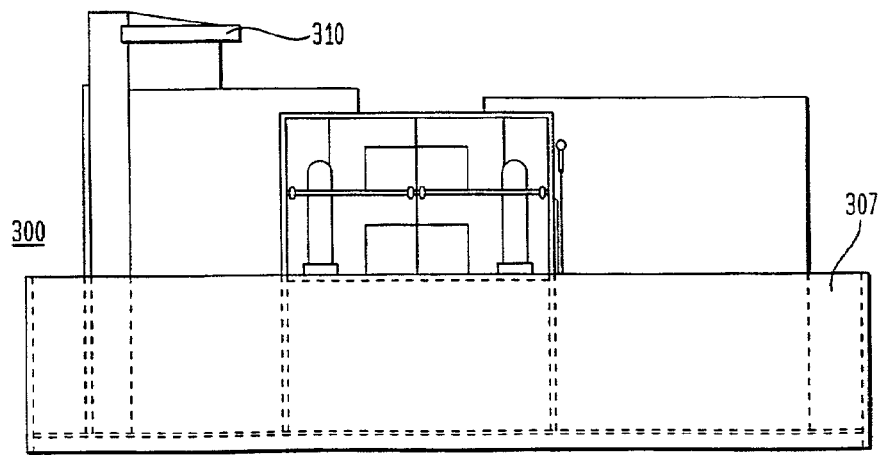

FIGS. 3–5 are top, end, and front plan representations, respectively, of a NiFe blend and distribution system 300. Distribution system 300 is shown to have a mix tank 302, a hold tank 303, a heater/chiller 304, a compartment 305 for pumps, filters, and valves, as well as a secondary containment region 307. Mix tank 302 is provided with a mixer 310 that functions to create a vortex pattern (not shown) beginning along the side of mix tank 302 near the top, and extending at the center of the tank at the bottom. The vortex pattern, therefore, sweeps all areas of the tank. The mixer is placed off-center and at an angle to maximize the shearing action and the mixing effect.

In this embodiment of the invention, mix tank 302 and hold tank 303 are lined with Teflon® material (not specifically designated). It is desired to eliminate most tank seams (not shown) while maintaining the Teflon® material in contact with the solutions (not shown in this figure). In an alternative embodiment (not shown), seamless tanks are provided formed of high purity grade PVDF.

Also in the present embodiment, secondary containment region 307 is configured to be about half of the height of mix tank 302 and hold tank 303. In this embodiment, secondary containment region 307 has a capacity of approximately 1500 gals, which corresponds to approximately 110% of the combined volumes of the hold and mix tanks. In addition, the containment region has sufficient volume to accommodate all pumps and plumbing.

Figure 6A:
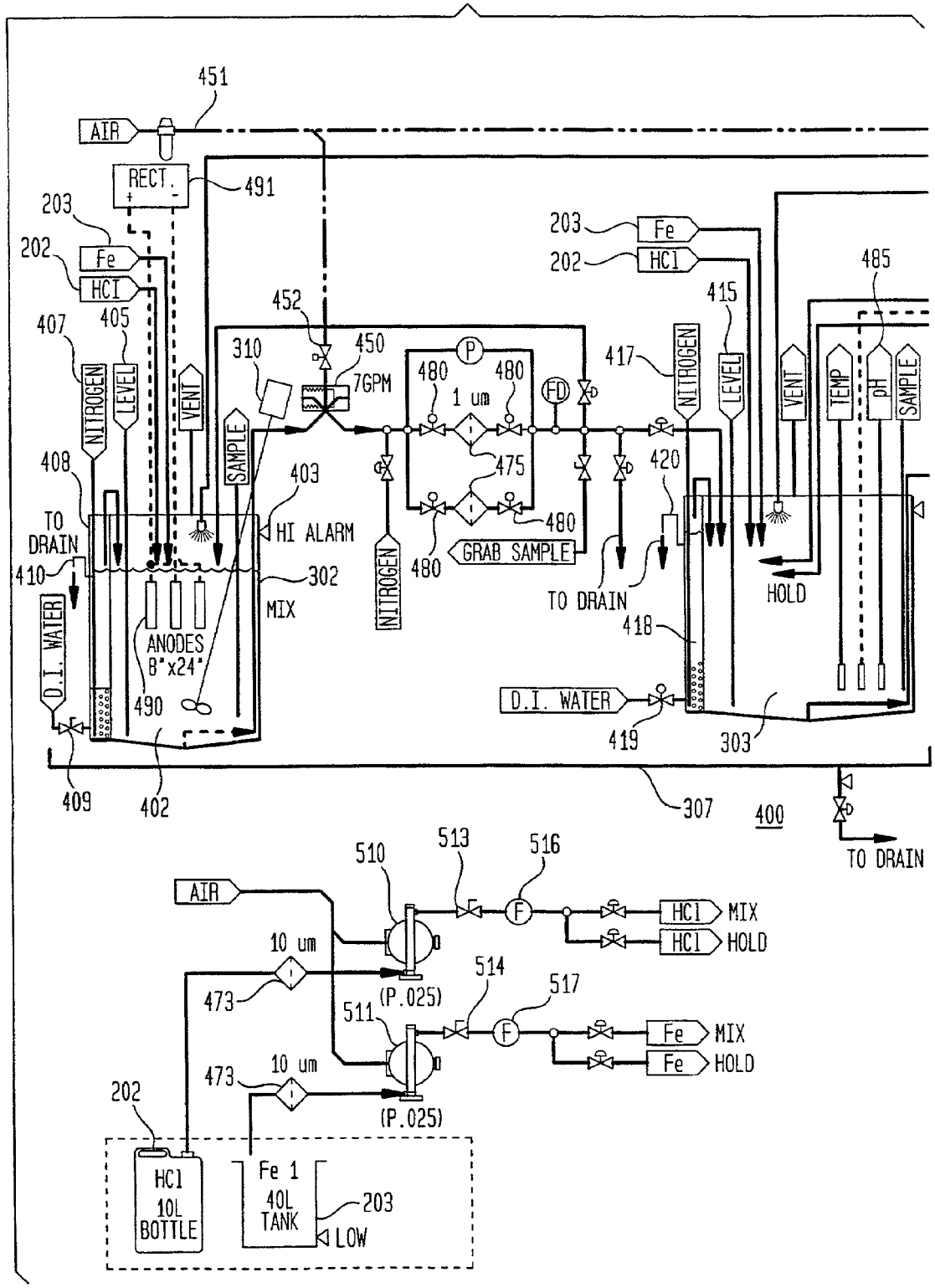
FIG. 6 is a schematic illustration of a system that controls the chemistry in hold and mix tanks of a NiFe plating system.
Figure 6B:
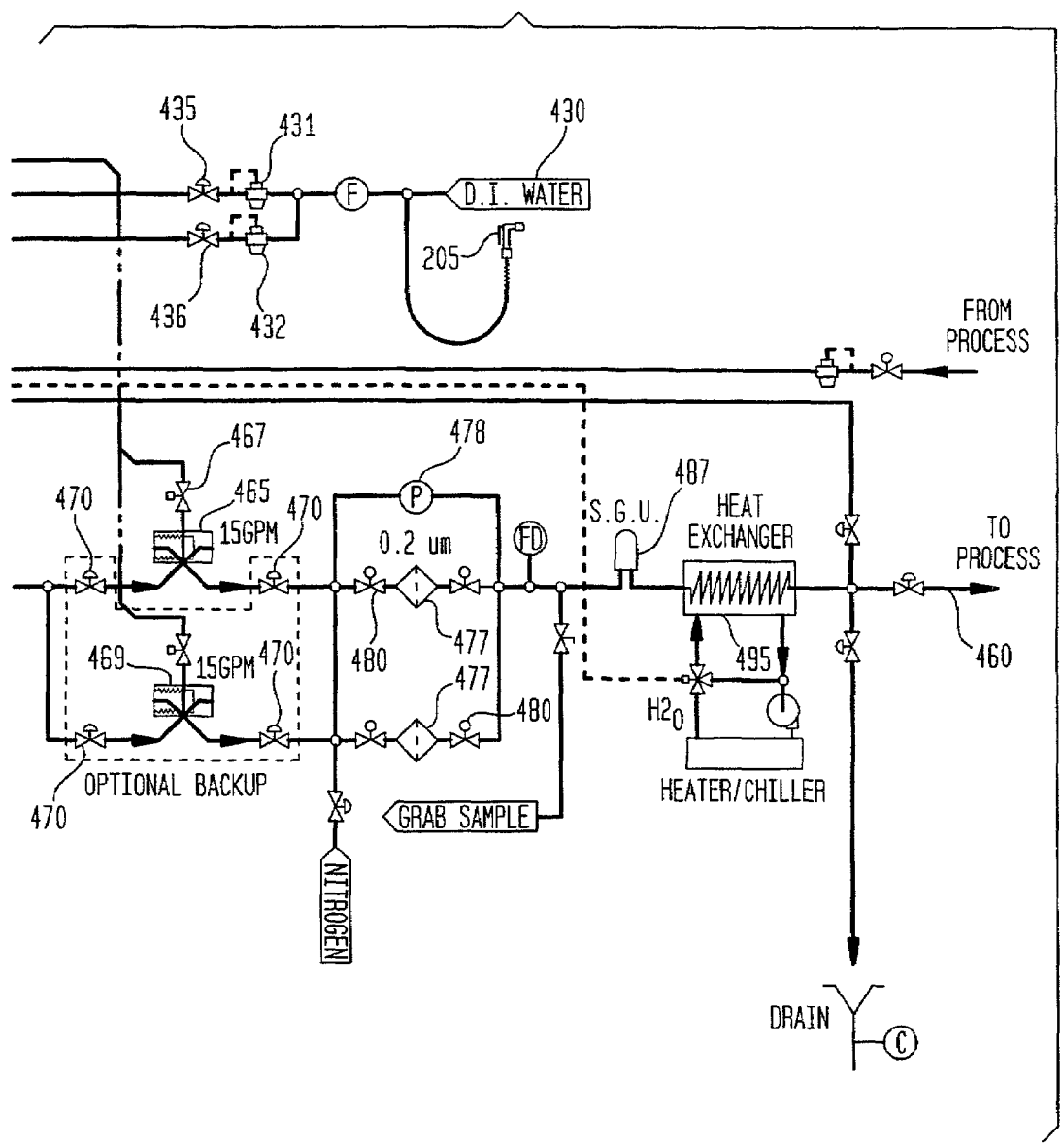

FIG. 6 is a schematic illustration of a chemical processing system 400 that controls the chemistry in hold and mix tanks, 302 and 303, respectively, of a NiFe plating system. Elements of structure that have previously been described are similarly designated. Mix tank 302 is shown to contain a plating solution 402 that is at a level lower than a high alarm level 403. In this specific illustrative embodiment of the invention, mix tank 302 has a 200 gallon capacity and is operated at 106 gallons (400 liters), and hold tank 303 has a capacity of 250 gallons, and is operated at 220 gallons (1000 liters).

All liquid delivery to the mix tank is monitored with the use of flow sensors, thereby achieving a reproducibility, in this embodiment, of ±2%. The level of accuracy can be made to approach the level of reproducibility with proper calibration. The flows of all liquids into mix tank 302 are confirmed with an in-tank level sensor 405 that provides a means of cross-checking between the flow sensor and the liquid level sensor. Preferably, level sensor 405 is configured to operate within its most linear and repeatable range. This enables the fluid to be delivered in a stable manner over a long period of time, without requiring recalibration after short periods of time.

In a preferred embodiment of the invention, level sensor 405 is a pneumatic device that facilitates continuous level sensing. This form of sensor is precise and trouble-free, and unlike external proximity sensors, will not falsely be activated by a light crystalline tank wall build-up or other changes in environmental conditions, such as humidity. The present pneumatic sensors are not affected by tank wall build-up, foam, stirring, temperature, humidity, RF interference, or electrical noise. The present pneumatic sensors usually will not require adjustments after installation. Moreover, as can be seen from FIG. 6, level sensor 405 provides a continuous measurement along the full depth of mixing tank 302. This significant feature allows an immediate inventory of contents of the tank that is used by the control software (not shown) for continuous monitoring of pump performance and for confirmation of flow sensor accuracy. It should be understood that the gas flow rate in the level sensor is very low, on the order of 10 cc/min, so as to minimize dehydration of the plating solution. The inventor herein has discovered through testing that the low gas flow rate level sensor has essentially no detectible effect on the process resulting from dehydration.

Nitrogen 407 is delivered to mix tank 302 in a particularly advantageous manner. The tank nitrogen ventilation gas is humidified to prevent dehydration/concentration of the solutions. As shown, a vertical column 408 of deionized water is provided in communication with mix tank 302, and receives aerated nitrogen in the form of fine bubbles whereby the nitrogen gas becomes humidified. Deionized water is slowly supplied to column 408 through a needle valve 409, and overflows through an inverted U-tube 410 that maintains a predetermined level and prevents nitrogen gas from escaping. When the nitrogen gas reaches and escapes at the surface of the deionized water, it has reached approximately between 95% and 99% relative humidity. The relative humidity can be controlled by the extent of immersion of the nitrogen gas outlet within column 408. This is enough to retard nearly all plating solution water evaporation. Moreover, liquid column 408 is attached to the side of the mix tank and is insulated so that the temperature in the water column is identical to that of the plating solution, thereby assuring the correct humidity relative to the solution tank in air space conditions. The humidified nitrogen gas is then delivered to mix tank 302 so as to form a gas blanket over plating solution 402. This method prevents over humidifying of the nitrogen gas, which would cause solution growth, such as can occur with conventional fog humidifiers when they are imbalanced.

Hold tank 303 is supplied with a level monitoring arrangement 415 that is similar to that described hereinabove with respect to mix tank 302. In addition, a nitrogen gas 417 is delivered into a column 418 to create bubbles of nitrogen gas therein. Deionized water is conducted to the column via a needle valve 419, the excess deionized water being permitted to drain out of U-shaped outlet 420. In this specific illustrative embodiment of the invention, the nitrogen gas is humidified in a manner similar to that discussed hereinabove with respect to liquid column 408.

Deionized water is provided to the mix and hold tanks. As shown, a source of deionized water 430 is conducted via respective pressure regulators 431 and 432 and pneumatic valves 435 and 436 to the mix and hold tanks. In both cases, the deionized water enters the tanks as a spray so that as each tank is rinsed or filled, all areas are reached. The pressure regulators ensure that a full cone and consistent rate of flow are achieved out of each spray head. In a practical embodiment of the invention, it is important to maintain adequate constant pressure, as fluctuating pressures will compromise cleaning effectiveness and will generate unnecessary control system flow rate warnings.

In one embodiment of the invention, the solution that is transferred from mix tank 302 to hold tank 303 is motivated by a bellows pump 450 that operates pneumatically in response to air supplied from a regulated and filtered air supply 451 and an electric valve 452. It is preferred that the solution thus transferred be temperature adjusted prior to entering hold tank 302. Otherwise, it would be difficult to maintain the hold tank temperature within a specified ±0.1° C. during the transfer.

Fluid from hold tank 303 is conducted to a plating process 460 (not shown) by operation of a bellows pump 465. This pump operates in response to air supplied from source 451 and controlled via an electric valve 467. In this specific illustrative embodiment of the invention, there is provided a back-up recirculation pump 469 that serves to minimize system down time when pump maintenance is required. In this embodiment, pump switch-over is performed automatically upon operator request, which controls pneumatic valves 470.

Bellows pumps 465 and 469 are ultrapure Teflon® bellows-type manufactured by White Knight. The model AT300 bellows pump delivers 10 to 20 gpm, depending upon the pressure head. These pumps are suitable for the hold/distribution tank recirculation loop. A model AT100 bellows pump delivers 5 to 8 gpm and is suitable for mix tank recirculation, filtration, and transfer to the hold tank (bellows pump 450). Since these pumps are characterized by low pulsations, a pulse dampener is not commonly used therewith.

Referring to bellows pumps 465 and 469, these pumps are associated with respective ones of pneumatic valves 470 and filters 477. Control over valves 470 permit automatic switching of the bellows pumps and the filters, facilitating pump maintenance and filter replacement. In this specific illustrative embodiment of the invention, the automatic switch is responsive to a differential pressure that is developed across the filters, and which is monitored by differential pressure sensor 478.

In this embodiment of the invention, three successive levels of filtering are provided. Each level is of a sequentially finer size to prevent early loading of the filters and provide finer filtration where it is needed most. The first stage of filtering is in the form of strainers 473 having a 10 micron size locate at the feed stock outlets. The second level of filtration corresponds to filters 475 at the outlet of mix tank 302. Filters 475 are 1 micron filters. The third level of filtration corresponds to 0.2 micron filters 477 at the outlet of hold tank 303. Ball valves 480, which may be manually operated, are provided to permit equipment to be isolated for shut down and maintenance purposes.

In this embodiment of the invention, delivery of a precise amount of chemical constituent to the mix container, the hold container, or a plurality of mix and hold containers is achieved using respective pumps 510 and 511 which are shown in FIG. 6 to be coupled to respective ones of trainers 473. In this specific illustrative embodiment of the invention, pumps 510 and 511 are pneumatic, positive displacement, double diaphragm pumps that by virtue of their being pneumatically operated, achieve a limited maximum closed flow pressure, but nevertheless achieve a reasonably high dynamic range. Commercially available pumps that are suitable for the practice of this aspect of the invention are available from ARO. In this specific embodiment, WILDEN Model P.025 pumps are used. These pumps are relatively inexpensive and require minimal maintenance, yet, as will be described herein, they achieve high accuracy and precise delivery of chemical.

As shown, pump 510 is arranged to pump HCl from an HCl source in region 202, and pump 511 is arranged to pump Fe from a Fe source also in region 202. In this specific illustrative embodiment of the invention, the HCl source is a 10 liter bottle, and the Fe source is a 40 liter tank.

Each of pumps 510 and 511 is coupled at its output to a respectively associated one of orifices 513 and 514. In this embodiment, the orifices have an internal diameter of approximately between 0.010" and 0.090". Preferably, the orifices have an internal diameter of approximately between 0.030" and 0.060". In a typical embodiment, the internal diameter is between 0.040" and 0.050". The orifices are coupled to respective ones of flow meters 516 and 517 which in this embodiment of the invention are conventional paddle wheel style flow meters. Notwithstanding that these inexpensive flow meters have a non-linear characteristic, high accuracy nevertheless is achieved because the combination of the pumps and orifices maintains the flow rates within narrow ranges, preferably within the linear region of the flow meters' characteristic response curves, but in any case narrow enough that the non-linearity is if insignificant effect. Thus, with relatively inexpensive components, surprisingly high accuracy is achieved for the delivered quantum of the chemical. The precision delivery arrangement of the present invention is able to supply replenishment chemical to one or more mix or hold tanks, illustratively eight such tanks.

In order to provide continuous and accurate pH readings, two pH sensors are used. One pH sensor (not shown) is located in analyzer 100 which is auto-calibrated daily, or at some other specified interval. As a result of these precision calibrations, this off-line pH sensor provides better than ±0.02 pH accuracy and ±0.01 pH repeatability. In operation, the off-line pH sensor, which is off-line (i.e., not subjected continuously to the sample of the chemical solution being used in the plating system) is subjected to a calibrating solution of known pH value, and a reading is taken. Immediately thereafter, the off-line pH sensor is subjected to a sample of the same batch to which the on-line pH sensor is being subjected (i.e., the on-line sample), and a second reading is taken. This second reading is compared to the reading of the on-line pH sensor, which is pH sensor 485 located in hold tank 303. The difference between the readings of the on-line and off-line pH sensors on the sample solution constitutes a correction that is added to achieve an accurate value of the pH of the sample solution. The on-line sensor is immersed and provides continuous process readings. The sensor is corrected to read the same as the calibrated (off-line) sensor whenever a pH reading is read in the calibrated system. Deviations exceeding a user-defined amount are reported as warnings. A high quality research grade pH sensor drifts on the order of 0.002 pH per day, and a typical offset value used to effect the present correction is <0.01 pH.

Specific gravity is monitored by a specific gravity unit 487. This specific gravity monitor is an Anton Paar Model DPR407NYB transducer that is located in the recirculation loop. This commercially available specific gravity sensor has a published repeatability of ±0.00001 g/ml. In some embodiments, specific gravity sensor 487 may be provided with an associated partial by-pass valve (not shown) to prevent it from causing too much flow restriction.

In some embodiments of the invention, mixing time is minimized in mix tank 302 by a liquid ejector (not shown) on the inlet line to the tank. Such an ejector increases volumetric flow in the tank several-fold over using a pump alone. The liquid ejector is a passive device that requires no power or special maintenance, as opposed to a mixer, or high speed pump.

FIG. 6 additionally shows anodes 490 that are electrically coupled to a rectifier 491 for effecting the dummy plating. In some embodiments of the invention, a small plating cell (not shown) located above mix tank 302 is provided to allow dummy plating to occur in a separate, more accessible area. This would allow the anodes and cathodes to be isolated from the mix solution and rinsed at any time, independent of mix tank activity. In such an arrangement, recirculating NiFe solution may be routed through the plating cell and overflowed to mix tank 302 or by-passed and routed directly to the mix tank. Any particulate matter sloughing off of the anodes or cathodes gathers at the bottom of the cell where it is routed to a drain, rather than passed to the next tank.

The figure shows a heat exchanger 495 at the exit of hold tank 303. This enables supplying solution to the recirculation loop at the most consistent and stable temperature. Heat exchanger 495 is a water-jacketed device located just prior to the recirculation loop. Thus, accuracy is maintained and offsets are prevented that would result from varying demand or flow rates. The temperature of the heating water is regulated according to the desired NiFe solution exit temperature, and not the internal water temperature. Other forms of heaters may be used in the practice of the invention.

Figure 7:
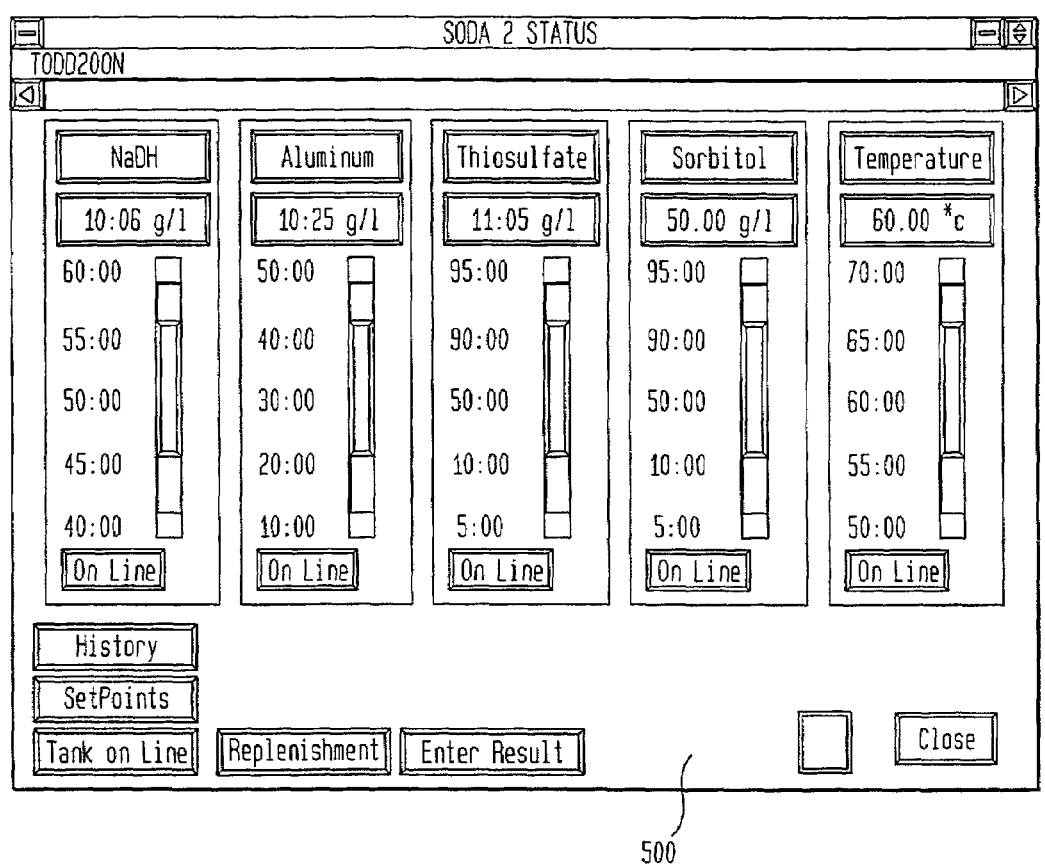
FIG. 7 is a representation of a graphical user interface (GUI) screen of a status condition of the system as represented in the logic controller.

FIG. 7 is a representation of a graphical user interface (GUI) screen of a status condition of the system as represented by the logic controller (not shown). As shown in this figure, a screen 500, which may be in the form of a conventional cathode ray tube, illustrates a variety of status conditions for system 400. Screen 500 is but one of a number of arrangements that can be provided to illustrate the status conditions of the system. In addition, selection of appropriate buttons yields other screens that provide information relating to system history, indication of whether a particular tank is on-line, replenishment status, error conditions, etc.

Figure 8:
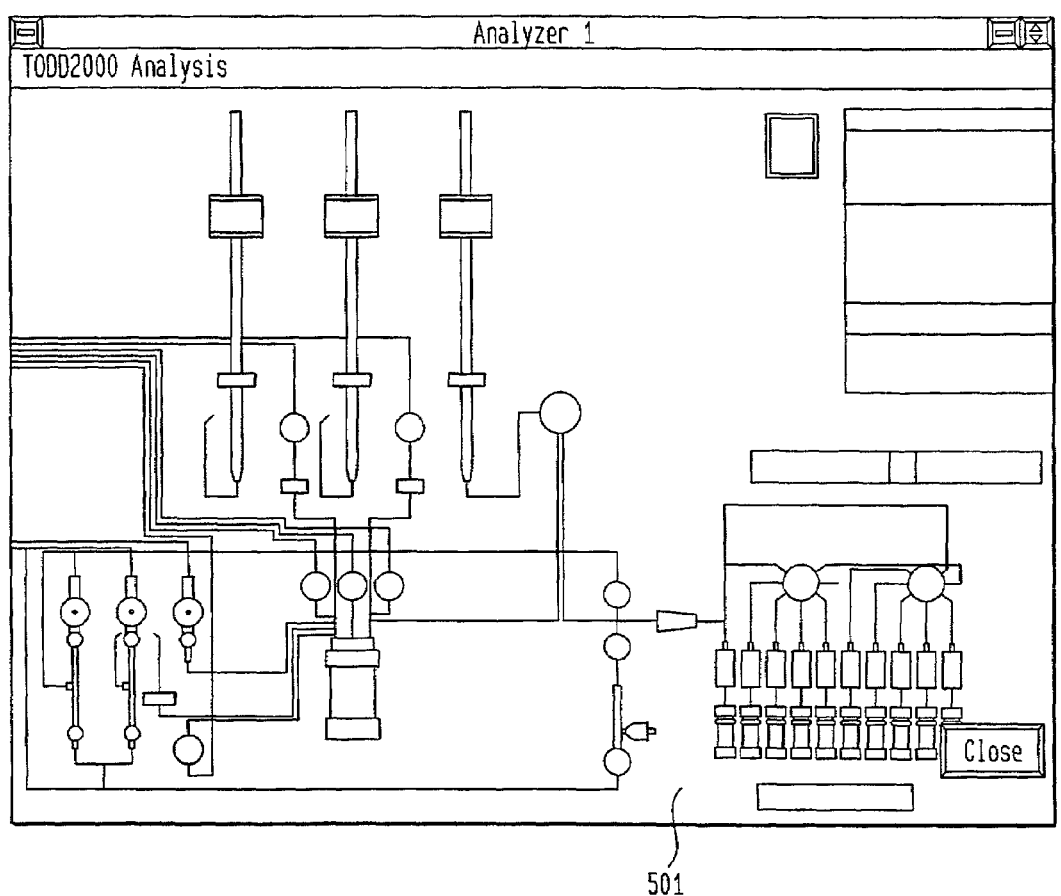
FIG. 8 is a representation of a graphical user interface (GUI) screen of an analyzer condition of the system as represented in the logic controller.

FIG. 8 is a representation of a graphical user interface (GUI) screen 501 of an analyzer condition of the system, as represented by the logic controller (not shown). As shown, this screen depicts a schematic sample process and provides indication of the parameters in the ongoing analysis. Again, this is but one of several display formats that can be employed in the practice of the invention.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A chemical control system for controlling the chemistry of a chemical solution having predetermined chemical constituents in a plating system, the chemical control system comprising:
    a mix containter for containing a plating solution;
    a hold container for containing a plating solution delivered from said mix container;
    a precision delivery arrangement for delivering a predetermined quantum of a predetermined constituent of the plating solution to said mix container, said hold container, or both;
    a transfer pump for urging the plating solution to be transferred from said mix container to said hold container;
    a source of deionized water in communication with said mix container; and
    a nitrogen gas source in communication with said source of deionized water for providing to said mix container a flow of nitrogen source gas to which has been added deionized water to form humidified nitrogen gas, the humidified nitrogen gas being humidified to a predetermined relative humidity with respect to the temperature of the plating solution in said mix container.

2. The chemical control system of claim 1, wherein the plating solution is used in a NiFe plating system.

3. The chemical control system of claim 1, wherein said source of deionized water comprises a column for containing the deionized water and releasing the humidified nitrogen gas, said column being in thermal communication with said mix container.

4. The chemical control system of claim 3, wherein there is further provided a nitrogen source gas outlet arranged to release the nitrogen source gas to the deionized water within said column.

5. The chemical control system of claim 4, wherein said nitrogen source gas outlet is arranged to release the nitrogen source gas at a variably selectable location along said column, the relative humidity of the humidified nitrogen gas being responsive to the location along said column at which said nitrogen source gas outlet is arranged to release the nitrogen source gas to the deionized water.

6. The chemical control system of claim 1, wherein there is further provided a further nitrogen gas source for providing to said hold container a flow of further nitrogen source gas that has been humidified to a predetermined relative humidity with respect to the temperature of the plating solution in said hold container.

7. The chemical control system of claim 6, wherein said further nitrogen gas source comprises a further column for containing deionized water and releasing the humidified further nitrogen gas, said column being in thermal communication with said hold container.

8. The chemical control system of claim 7, wherein there is further provided a further nitrogen source gas outlet arranged to release the further nitrogen source gas to the deionized water within said further column.

9. The chemical control system of claim 8, wherein said further nitrogen source gas outlet is arranged to release the further nitrogen source gas at a variably selectable location along said further column, the relative humidity of the humidified further nitrogen gas being responsive to the location along said further column at which said further nitrogen source gas outlet is arranged to release the further nitrogen source gas to the deionized water.

10. The chemical control system of claim 1, wherein said precision delivery arrangement comprises a serial arrangement of a source pump and an orifice.

11. The chemical control system of claim 10, wherein said source pump is a pneumatic pump.

12. The chemical control system of claim 11, wherein there is provided a further mix container, and said a precision delivery system is arranged to deliver a predetermined quantum of a predetermined constituent of the plating solution to each of said mix container and to said further mix container.

13. The chemical control system of claim 11, wherein said source pump is a positive displacement, double diaphragm pump.

14. The chemical control system of claim 11, wherein said source pump is configured to pump the predetermined constituent of the plating solution at a constituent flow rate in a range of approximately 100 ml/min to 1.0 l/min.

15. The chemical control system of claim 14, wherein said source pump has a rated flow rate of approximately three to seven times the constituent flow rate.

16. The chemical control system of claim 15, wherein said source pump has a rated flow rate of at least approximately four times the constituent flow rate.

17. The chemical control system of claim 14, wherein said orifice has an internal diameter of approximately between 0.010" and 0.090".

18. The chemical control system of claim 17, wherein said orifice has an internal diameter of approximately between 0.040" and 0.050".

19. The chemical control system of claim 1, wherein there are further provided:
    a mix pneumatic level sensor for providing an indication of the level of the plating solution in said mix container; and
    a hold pneumatic level sensor for providing an indication of the level of the plating solution in said hold container.

20. The chemical control system of claim 19, wherein said mix and hold pneumatic level sensors are arranged to provide a measurement along a predetermined length of the said mix and hold containers, respectively.

21. The chemical control system of claim 19, wherein said mix and hold pneumatic level sensors each are arranged to employ a gas flow rate on the order of 10 cc/min.

22. The chemical control system of claim 1, wherein said transfer pump is a pneumatically operated bellows pump.

23. The chemical control system of claim 22, wherein said transfer pump is provided with a bellows made of Teflon polymer.

24. The chemical control system of claim 1, wherein there is further provided a dummy plating anode in said mix container.

25. The chemical control system of claim 1, wherein there is further provided a chemical analyzer system that is adapted to analyze the plating solution in said mix container.

26. The chemical control system of claim 25, wherein said chemical analyzer system analyzes the plating solution in said hold container.

* * * * *

UNITED STATES PATENT AND TRADEMARK OFFICE
CERTIFICATE OF CORRECTION

PATENT NO.       : 7,147,827 B1
APPLICATION NO.  : 09/674635
DATED            : December 12, 2006
INVENTOR(S)      : Todd A. Balisky It is certified that error appears in the above-identified patent and that said Letters Patent is hereby corrected as shown below:

Column 4, Line 8: Insert a period after "preparation"

Column 4, Line 29: Change "filler" to --filter--

Column 4, Line 33: Insert a period after "loop"

Column 7, Line 17: Insert a period after "contamination"

Column 9, Line 33: Before "associated", change "a" to --an--

Column 13, Line 62: Change "if" to --of--

Column 16, Claim 12, Line 34: Before "precision", delete "a"

Column 16, Claim 12, Line 35: Change "system" to --arrangement--

Signed and Sealed this

Fifteenth Day of May, 2007

JON W. DUDAS
*Director of the United States Patent and Trademark Office*